US007314895B2

(12) United States Patent
Freedman et al.

(10) Patent No.: US 7,314,895 B2
(45) Date of Patent: Jan. 1, 2008

(54) THERMOPLASTIC COMPOSITION COMPRISING A $CO_2$ RELEASING MATERIAL

(75) Inventors: Jon Freedman, Auburn, AL (US); William Spano, Opelika, AL (US); Deepti S. Gupta, Auburn, AL (US)

(73) Assignee: CSP Technologies, Inc., Amsterdam, NY (US)

( * ) Notice: Subject to any disclaimer, the term of this patent is extended or adjusted under 35 U.S.C. 154(b) by 290 days.

(21) Appl. No.: 10/794,306

(22) Filed: Mar. 5, 2004

(65) Prior Publication Data
US 2004/0242746 A1 Dec. 2, 2004

Related U.S. Application Data

(63) Continuation-in-part of application No. 10/033,973, filed on Dec. 19, 2001, now Pat. No. 6,852,783.

(60) Provisional application No. 60/452,004, filed on Mar. 5, 2003.

(51) Int. Cl.
*C08K 5/09* (2006.01)

(52) U.S. Cl. ............... 524/321; 524/300; 524/424; 524/425; 524/426; 524/427

(58) Field of Classification Search ........... 524/300, 524/320, 321, 424, 425, 426, 427
See application file for complete search history.

(56) References Cited

U.S. PATENT DOCUMENTS

| 148,971 | A | 3/1874 | Whluting |
|---|---|---|---|
| 1,532,831 | A | 4/1925 | Mastin |
| 2,202,742 | A | 5/1940 | McCorkhill |
| 2,511,666 | A | 6/1950 | Barr |
| 2,638,179 | A | 5/1953 | Yard |
| 2,941,964 | A | 6/1960 | Houston et al. |
| 2,991,500 | A | 7/1961 | Hagen |
| 3,013,308 | A | 12/1961 | Amour |
| 3,101,242 | A | 8/1963 | Jackson, Jr. |
| 3,156,402 | A | 11/1964 | Dupuis |
| 3,245,946 | A | 4/1966 | O'Connar et al. |
| 3,256,411 | A | 6/1966 | Grasty |
| 3,322,355 | A | 5/1967 | Bryant |
| 3,326,810 | A | 6/1967 | Dolan et al. |
| 3,344,092 | A | 9/1967 | Pavuk |
| 3,537,676 | A | 11/1970 | Miller |
| 3,567,085 | A | 3/1971 | FLores |
| 3,687,062 | A | 8/1972 | Frabink |
| 3,704,806 | A | 12/1972 | Plachenov et al. |
| 3,730,372 | A | 5/1973 | Komendowski |
| 4,394,144 | A | 7/1983 | Aoki |
| 4,447,565 | A | 5/1984 | Lula et al. |
| 4,464,443 | A | 8/1984 | Farrell et al. |
| 4,485,204 | A | 11/1984 | Nabors |
| 4,533,576 | A | 8/1985 | Tanahashi et al. |
| 4,573,258 | A | 3/1986 | Io et al. |
| 4,665,050 | A | 5/1987 | Degen et al. |
| 4,666,607 | A | 5/1987 | Josefiak et al. |
| 4,686,093 | A | 8/1987 | Flanigen et al. |
| 4,725,393 | A | 2/1988 | Nasu |
| 4,770,944 | A | 9/1988 | Farrell et al. |
| 4,772,300 | A | 9/1988 | Cullen et al. |
| 4,783,056 | A | 11/1988 | Abrams |
| 4,783,206 | A | 11/1988 | Cullen et al. |
| 4,792,484 | A | 12/1988 | Moritani |
| 4,834,234 | A | 5/1989 | Sacherer et al. |
| 4,969,998 | A | 11/1990 | Henn |
| 4,994,312 | A | 2/1991 | Maier et al. |
| 5,078,909 | A | 1/1992 | Shigeta et al. |
| 5,114,003 | A | 5/1992 | Jackisch et al. |
| 5,118,655 | A | 6/1992 | Pedersen |
| 5,128,182 | A | 7/1992 | Bunker et al. |
| 5,130,018 | A | 7/1992 | Tolman et al. |
| 5,143,763 | A | 9/1992 | Yamada et al. |
| 5,154,960 | A | 10/1992 | Mucci et al. |
| 5,218,182 | A | 6/1993 | Vogel et al. |
| 5,267,646 | A | 12/1993 | Inoue et al. |
| 5,286,407 | A | 2/1994 | Inoue et al. |
| 5,304,419 | A | 4/1994 | Shores |

(Continued)

FOREIGN PATENT DOCUMENTS

| DE | 4012799 | 10/1991 |
|---|---|---|
| DE | 4013799 | 10/1991 |
| EP | 0172714 | 2/1986 |
| EP | 0225593 | 6/1987 |
| EP | 0454967 | 11/1991 |
| EP | 0831128 | 3/1998 |
| JP | 62294441 | 12/1987 |
| NL | 6605358 | 10/1966 |
| WO | WO96/29603 | 9/1996 |
| WO | WO96/33108 | 10/1996 |
| WO | WO9727483 | 7/1997 |
| WO | WO9732663 | 9/1997 |
| WO | WO9839231 | 9/1998 |

OTHER PUBLICATIONS

Patent Abstracts of Japan, vol. 012, No. 191 (C-501), Jun. 3, 1988 & JP 62294441 (Toshiyukinakajima) Dec. 21, 1987.

(Continued)

*Primary Examiner*—Edward J. Cain
(74) *Attorney, Agent, or Firm*—Greenberg Traurig, LLP

(57) ABSTRACT

A composition comprising a thermoplastic and a $CO_2$ releasing material; wherein the $CO_2$ releasing material comprises: a) a carbon and oxygen containing salt of an alkali or alkaline earth metal; and b) an acid; the $CO_2$ releasing material has a sufficient amount and ratio of the carbon and oxygen containing salt of the alkali or alkaline earth metal and the acid so that, in the presence of water, the $CO_2$ releasing material reacts to release $CO_2$ gas through the thermoplastic into a surrounding environment.

10 Claims, No Drawings

U.S. PATENT DOCUMENTS

| | | | |
|---|---|---|---|
| 5,320,778 A | 6/1994 | Miksic et al. | |
| 5,344,589 A | 9/1994 | Miksic et al. | |
| 5,393,457 A | 2/1995 | Miksic et al. | |
| 5,399,609 A | 3/1995 | Moss | |
| 5,415,907 A | 5/1995 | Inoue et al. | |
| 5,432,214 A | 7/1995 | Lancesseur | |
| 5,489,399 A * | 2/1996 | Koyakumaru et al. | 252/373 |
| 5,494,155 A | 2/1996 | Evans et al. | |
| 5,496,397 A | 3/1996 | Fischer et al. | |
| 5,518,761 A | 5/1996 | Hatsuda et al. | |
| 5,551,141 A | 9/1996 | De'Ath et al. | |
| 5,580,369 A | 12/1996 | Belding et al. | |
| 5,611,962 A * | 3/1997 | Garcia et al. | 524/320 |
| 5,656,503 A | 8/1997 | May | |
| 5,773,105 A | 6/1998 | Klett | |
| 5,814,136 A | 9/1998 | Wood | |
| 5,844,027 A | 12/1998 | Burdick et al. | |
| 5,911,937 A | 6/1999 | Hekal | |
| 6,080,350 A | 6/2000 | Hekal | |
| 6,214,255 B1 | 4/2001 | Hekal | |
| 6,221,446 B1 | 4/2001 | Hekal | |
| 6,306,941 B1 | 10/2001 | Klatt et al. | |
| 6,313,068 B1 | 11/2001 | Daly et al. | |
| 6,323,269 B1 | 11/2001 | Skelhorn et al. | |
| 6,344,509 B1 | 2/2002 | Mizutani | |
| 6,365,549 B2 | 4/2002 | Sisler | |
| 6,740,731 B2 | 5/2004 | Bigg et al. | |

OTHER PUBLICATIONS

Patent Abstracts of Japan, vol. 1995, No. 08, Sep. 29, 1995 & JP 07125764 Japan Tobacco Inc., May 16, 1995.

* cited by examiner

THERMOPLASTIC COMPOSITION COMPRISING A $CO_2$ RELEASING MATERIAL

CROSS-REFERENCE TO RELATED CASES

This application is a continuation-in-part of U.S. Ser. No. 10/033,973, filed Dec. 19, 2001 now U.S. Pat. No. 6,852,783. This application also claims the benefit under 35 U.S.C. 119(e) of U.S. Provisional Application Ser. No. 60/452,004, filed Mar. 5, 2003.

DETAILED DESCRIPTION OF THE PRESENT INVENTION

The present invention relates to a $CO_2$ releasing composition comprising a combination of a $CO_2$ releasing material that is incorporated within a thermoplastic. In the presence of water, the $CO_2$ releasing material reacts to release $CO_2$ gas through the thermoplastic into the surrounding environment.

Suitable thermoplastic materials include, but are not limited to, polyolefins such as polypropylene and polyethylene, polyisoprene, polybutadiene, polybutene, polysiloxane, polycarbonates, polyamides, ethylene-vinyl acetate copolymers, ethylene-methacrylate copolymer, poly(vinyl chloride), polystyrene, polyesters, polyanhydrides, polyacrylianitrile, polysulfones, polyacrylic ester, acrylic, polyurethane and polyacetal, or copolymers or mixtures thereof. It is understood that the desired thermoplastic is selected based on the end-use. For example, the specific thermoplastic selected may be based on the desired level of gas permeability so as to allow the desired level of moisture into the thermoplastic and/or the desired amount of $CO_2$ gas out of the thermoplastic. In another example, the desired thermoplastic may be selected that has the desired end-use properties of the shaped article (e.g. tensile strength, moldability, elasticity, cost).

In yet a further embodiment, the $CO_2$ releasing material may be a carbon and oxygen containing salt of an alkali or alkaline earth metal, such as the carbonates of sodium, potassium, magnesium, or calcium. Bicarbonates of the same may also be employed. In yet a further embodiment, the $CO_2$ releasing material is calcium carbonate. In yet a further embodiment, the $CO_2$ releasing material may be baking powder. Mixtures of $CO_2$ releasing compositions are also possible.

In an embodiment of the composition, the $CO_2$ releasing material loading level is between about 10% to about 80%, more specifically from about 10% to about 20%, about 20% to about 40%, about 40% to about 60%, and/or about 60% to about 80% by weight with respect to composition.

In another embodiment, the $CO_2$ releasing material may be a combination of a carbonate with an acid. Suitable carbonates include, but are not limited to, such as, but not limited to, sodium bicarbonate and/or calcium carbonate. Suitable acids include, but are not limited to, citric acid, maleic acid, malic acid, fumaric acid, polyacrylic acid, oxalic acid and/or mixtures thereof. In one specific embodiment, the acid can be used in an anhydrous form to prevent the reaction from occurring prematurely. In yet another embodiment, to reduce the possibility of the reaction initiating prematurely, the acid is in its solid granular form and is substantially free of moisture.

In one embodiment, the $CO_2$ releasing material in the $CO_2$ releasing composition is a activated by moisture and thus, results in the controlled release of $CO_2$. As such, the composition including the thermoplastic and $CO_2$ releasing material may be designed (e.g. the amount and/or morphology) to produce the desired amount of $CO_2$ release per unit time based on the desired environment.

The $CO_2$ releasing composition may be produced in any desired form. Suitable forms include, but are not limited to, film, sheets, inserts (e.g. tape strips, tabs) and liners. The following examples are merely exemplary and are not meant to limit the application of the present invention. For example, the composition of the present invention may be formed into an insert for inclusion within the interior of the package. An example of one form of an insert is a plug, tab, strip, patch or sleeve of any suitable shape. In another embodiment, a liner may be formed from the composition of the present invention that has an exterior surface substantially conforming to at least a portion of an interior surface of the package. In yet another embodiment, the composition of the present invention may be used to form a film or sheet. In one example, the sheeting of the present invention may be joined with another sheet. In at least one embodiment, the sheets are effectively laminated one to the other so that an exterior layer may be established adjacent to the composition of the present invention which is substantially gas impermeable. The laminate sheet may then be used to wrap an item which is to be stored in a controlled environment. One means by which the joinder process may be accomplished is through a thermal extrusion procedure.

The desired article may be produced by any conventional process of making a plastic article that includes, but is not limited to, extrusion, melt inflation (e.g. blown film, blow moulding, thermoforming) and/or injection molding. At some stage of the process, the $CO_2$ releasing material is blended with the thermoplastic and the resulting blend is subsequently processed into the desired shape article.

The following are merely illustrative examples of various compositions of the present invention. It is understood that these are merely illustrative examples and are not meant to limit the present invention.

| Formulation Number | Materials | Wt percentage |
|---|---|---|
| 001 | B1H4E Resin | 95.00% |
|  | PolyOx 750 | 5.00% |
| 002 | $CaCO_3$ | 50.00% |
|  | Luviskol VA64 | 7.00% |
|  | Carbopol 971 P-NF | 13.00% |
|  | EXACT 4023 | 30.00% |
| 003 | $CaCO_3$ | 40.00% |
|  | Luviskol VA64 | 10.00% |
|  | Molecular Sieve 4A | 15.00% |
|  | EXACT 4023 | 35.00% |
| 004 | $NaHCO_3$ | 35.00% |
|  | PolyOx 750 | 5.00% |
|  | Carbopol 971 P-NF | 25.00% |
|  | EXACT 4023 | 35.00% |
| 005 | $NaHCO_3$ | 32.00% |
|  | Citric Acid | 28.00% |
|  | PolyOx 750 | 5.00% |
|  | EXACT 4023 | 35.00% |
| 006 | $NaHCO_3$ | 37.00% |
|  | Malic Acid | 37.00% |
|  | PolyOx 750 | 5.00% |
|  | EXACT 4023 | 21.00% |
| 007 | $NaHCO_3$ | 50.00% |
|  | Malic Acid | 25.00% |
|  | PolyOx 750 | 5.00% |
|  | EXACT 4023 | 20.00% |
| 008 | $NaHCO_3$ | 37.00% |
|  | Malic Acid | 37.00% |

-continued

| Formulation Number | Materials | Wt percentage |
|---|---|---|
| | 15-200 | 5.00% |
| | EXACT 4023 | 21.00% |
| 009 | NaHCO₃ | 37.00% |
| | Malic Acid | 37.00% |
| | Luviskol Va64 | 5.00% |
| | EXACT 4023 | 21.00% |
| 010 | Calcium Carbonate | 37.00% |
| | Malic Acid | 37.00% |
| | Pluronic F108 | 5.00% |
| | EXACT 4023 | 21.00% |
| 011 | NaHCO₃ | 35.00% |
| | Malic Acid | 35.00% |
| | PolyOx 750 | 10.00% |
| | EXACT 4023 | 20.00% |
| 012 | NaHCO₃ | 37.00% |
| | Malic Acid | 37.00% |
| | EXACT 4023 | 26.00% |
| 013 | CaCO₃ | 35.00% |
| | Malic Acid | 38.90% |
| | PolyOx 750 | 5.00% |
| | EXACT 4023 | 21.10% |
| 014 | CaCO₃ | 35.00% |
| | Malic Acid | 38.90% |
| | PolyOx 750 | 5.00% |
| | PP 3305 | 21.10% |
| 015 | CaCO₃ | 35.00% |
| | Citric Acid | 37.10% |
| | PolyOx 750 | 5.00% |
| | EXACT 4023 | 22.90% |
| 016 | CaCO₃ | 37.00% |
| | Citric Acid | 31.00% |
| | PolyOx 750 | 5.00% |
| | Calcium Hydroxide (anhydrous) | 6.00% |
| | EXACT 4023 | 21.10% |

The following examples illustrate the use of the present $CO_2$ releasing composition in the presence of moisture that activates the CO2 releasing material and thus, results in $CO_2$ being released through the thermoplastic into the surrounding environment.

In one example, the $CO_2$ releasing material initiates $CO_2$ production when the $CO_2$ releasing material is exposed to an elevated relative humidity of about at least 50% (measured at 22 C). In yet another example, when the $CO_2$ releasing material is exposed to increasing temperatures, the $CO_2$ production/release increases. Among other factors, it is understood that the $CO_2$ production/release rates are effected by the amount and proportion of carbonate and acid in the composition. In addition, the production/release rates is also effected by the MVTR of the thermoplastic, the exposure to a specific relative humidity and/or temperature.

In one application, the introduction of $CO_2$ gas lowers the ambient oxygen content within the package and thus, slows the respiration rate of natural and processed food products. In another example, when $CO_2$ converts to carbonic acid in the presence of moisture on the surface of a product, the increased level of carbonic acid on the surface of the product decreases the pH. As a consequence, bacterium that is sensitive to higher acidic levels are inhibited. In a further example, the increase in $CO_2$ gas reduces the overall oxygen content in the package and thus, the amount of oxidation and/or oxygen sensitive bacterium.

In one example of the above, the purpose of releasing $CO_2$ is to accomplish modified atmosphere packaging. As such, the control of the amount of $CO_2$ into the surrounding environment is used to achieve the optimum shelf life—the lowest amount of oxygen concentration before anaerobic respiration is initiated.

Examples of products that may be protected by the present invention include, but are not limited to, natural and processed food products such as cheese, luncheon meats, bacon, fermented diary products, fruits and vegetables, raw meats, poultry, fresh and salted fish, intermediate moisture foods (such as jerky, pet foods, and granola bars), high fat moist bakery products, acidified dairy products, mayonnaise and salad dressings, controlled atmosphere/modified atmosphere refrigerated extended shelf life foods (such as partially cooked meals, pasta dishes, sauces, cut fruit, and vegetable salads, and other water-bearing foods).

In yet another embodiment, the present invention may be used for a $CO_2$ releasing article in the following products. For example, in one illustrative example, the $CO_2$ releasing composition maintains an environment for fresh cut apples so as to maintain their texture and firmness at about 30-45% $CO_2$ and, optionally, also results in an $O_2$ level of about 2-5%. After about 24-hours of packaging the produce, the $CO_2$ releasing composition maintains an environment for fresh cut apples at a gas level of below about concentrations of 20% $CO_2$ and 5% $O_2$.

In another illustrative example, the $CO_2$ releasing composition maintains an environment for fresh cut lettuce so as to maintain their texture and firmness at below about 5% $CO_2$ and, optionally, also results in an $O_2$ level of about 2-5%, more particularly maintaining a $O_2$ concentration above about 2%.

In one example, the $CO_2$ releasing composition is integrated into a $CO_2$ releasing film into a package with barrier properties that can maintain the desired gas concentrations. Suitable barrier films include, but are not limited to, films having selective permeation to $O_2$ and $CO_2$ (e.g. a barrier film with a Beta value of less than about 1 where Beta is defined as the ratio of $CO_2$ and $O_2$ transmission in a film material).

In yet another illustrative example, the $CO_2$ releasing composition maintains an environment for warm baked goods so as to release $CO_2$ to slow aerobic respiration of organisms that may cause the bakery good to become stale. In addition, an absorbing material (e.g. a desiccant) may be incorporated into the composition to absorb detrimental levels of moisture.

In yet another example, the present invention may be incorporated into packages for the fresh flower market (retail and wholesale refrigerated cases). For example, elevated $CO_2$ levels have been found to maintain the green color of flower stems. In one specific example, the present invention may be incorporated into a film or incorporated/added to the present package that releases over a specified time period (e.g. 30 day period).

In another example, the present invention may be incorporated into packages for fresh or frozen seafood (e.g. frozen/thawed case ready seafood). For example, the $CO_2$ releasing composition produces sufficient $CO_2$ to elevate the $CO_2$ concentration in the package and, as such, slows aerobic respiration—while preventing anaerobic respiration. For example, the $CO_2$ releasing composition produces sufficient $CO_2$ to elevate the $CO_2$ concentration in the package to above about 30% with an ambient $O_2$ concentration of about 20% so as to slow the degradation of finned seafood. In another example, the $CO_2$ releasing composition produces sufficient $CO_2$ to elevate the $CO_2$ concentration in the package at a minimum of about 20% and the $O_2$ at about 20% to slow the growth of micro organisms on seafood. Under conventional conditions, Class A seafood can be sold up to 7 days from the catch and Class B seafood can be sold 8-14 days from the catch. It is believed that the conditions discussed above will result in extending the length of Class A seafood up to 10 days.

In another embodiment, the $CO_2$ releasing composition produces sufficient $CO_2$ to in a film form over a specified time (e.g. 7 day period) so as to maintains a gas environment of about 40% $CO_2$, 40% nitrogen and 20% oxygen.

In yet another embodiment, the present invention may also include, in addition to the $CO_2$ releasing composition that is incorporated within a thermoplastic, other components such as, but not limited to, a biologically active ingredient such as a biocide (e.g. chlorine dioxide), and/or a desiccant. For example, a biocide may be incorporated into the $CO_2$ releasing composition that produces sufficient $CO_2$ so as to result in a modified atmosphere of about 30% $CO_2$, about 20% $O_2$ and about 50% $N_2$ to increase the shelf life of seafood.

In a further example, the present invention may be incorporated into packages for fresh fruits and/or vegetables. In one specific example, this product would release over about a 14 day period. In yet another example, the present invention may be incorporated into packages for the produce market. In one specific example, the present invention would be incorporated into bulk shipment of products like shredded lettuce and berries.

In one example, typically, berries are bulk packaged and treated with $CO_2$ gas to elevate the $CO_2$ concentration in shipping containers. However, when the berries are removed from the bulk containers, gas levels typically are not maintained. Berries respire and produce $CO_2$ after harvesting. In one example, the $CO_2$ releasing composition is incorporated into a film in a single unit packages for berries and maintains an environment for berries so as to elevate the $CO_2$ level in the package (e.g. maintaining a $CO_2$ concentration of about 8-25%, most particularly at about 10-20%, in the package).

In another example, the present invention may be incorporated into packages for the meat. In one specific example, the present invention would be incorporated into both films to place inside refrigerated display cases and labels to be inserted into case ready packages of meat.

In another embodiment, the proper selection of the thermoplastic and the resulting $CO_2$ composition with the desired level of $CO_2$ permeability will allow packages according to the present invention to maintain the desired steady state levels of that gas within the package. In producing the composition of the invention, the steady state levels for $CO_2$ within the packages are determined by, at least, the following considerations: a) the permeability of the film; b) the volume of the headspace of the package; and c) the respiration rate and quantity of the desired material (e.g. fruit, seafood). The permeability of the film is determined by the characteristics of the film and the partial pressure gradients for the carbon dioxide across the film. The greater the partial pressure gradient between the package and the ambient environment outside the package for the gas, the greater the flux therein or thereout.

Whereas particular embodiments of the present invention have been described above as examples, it will be appreciated that variations of the details may be made without departing from the scope of the invention. One skilled in the art will appreciate that the present invention can be practiced by other than the disclosed embodiments, all of which are presented in this description for purposes of illustration and not of limitation. It is noted that equivalents of the particular embodiments discussed in this description may practice the invention as well. Therefore, reference should be made to the appended claims rather than the foregoing discussion of examples when assessing the scope of the invention in which exclusive rights are claimed.

What is claimed is:

1. A method for releasing $CO_2$ into a surrounding environment, comprising:
    exposing a $CO_2$ releasing composition to an elevated relative humidity environment; wherein the $CO_2$ releasing composition comprises: $CO_2$ releasing material blended with a thermoplastic, wherein the $CO_2$ releasing material comprises carbon and oxygen containing salt of an alkali or alkaline earth metal, and an acid;
    reacting the $CO_2$ releasing composition with moisture from the elevated relative humidity environment; and
    releasing a controlled amount of $CO_2$ gas through the thermoplastic into the surrounding environment, wherein the $CO_2$ releasing material has a sufficient amount and ratio of the carbon and oxygen containing salt of the alkali or alkaline earth metal and the acid so that, in the presence of moisture, the $CO_2$ releasing composition reacts to release $CO_2$ gas through the thermoplastic into a surrounding environment;
    wherein the carbon and oxygen containing salt of an alkali or alkaline earth metal is a carbonate;
    wherein the composition is in the form of a film, sheet, insert or liner; and
    wherein the $CO_2$ releasing composition maintains a package environment for baked goods at a sufficient release rate of $CO_2$ to slow aerobic respiration of organisms that causes the baked good to become stale.

2. The method of claim 1 wherein an absorbing material is incorporated into The composition to absorb detrimental levels of moisture.

3. A method for releasing $CO_2$ into a surrounding environment, comprising:
    exposing a $CO_2$ releasing composition to an elevated relative humidity environment; wherein the $CO_2$ releasing composition comprises: $CO_2$ releasing material blended with a thermoplastic, wherein the $CO_2$ releasing material comprises carbon and oxygen containing salt of an alkali or alkaline earth metal, and an acid;
    reacting the $CO_2$ releasing composition with moisture from the elevated relative humidity environment; and
    releasing a controlled amount of $CO_2$ gas through the thermoplastic into the surrounding environment, wherein the $CO_2$ releasing material has a sufficient amount and ratio of the carbon and oxygen containing salt of the alkali or alkaline earth metal and the acid so that, in the presence of moisture, the $CO_2$ releasing composition reacts to release $CO_2$ gas through the thermoplastic into a surrounding environment;
    wherein the carbon and oxygen containing salt of an alkali or alkaline earth metal is a carbonate;
    wherein the composition is in the form of a film, sheet, insert or liner; and
    wherein the $CO_2$ releasing composition maintains a package environment for cut flowers at a sufficient release rate of $CO_2$ to maintain the green color of flower stems for at least 30 days.

4. A method for releasing $CO_2$ into a surrounding environment, comprising:
    exposing a $CO_2$ releasing composition to an elevated relative humidity environment; wherein the $CO_2$ releasing composition comprises: $CO_2$ releasing material blended with a thermoplastic, wherein the $CO_2$ releasing material comprises carbon and oxygen containing salt of an alkali or alkaline earth metal, and an acid;
    reacting the $CO_2$ releasing composition with moisture from the elevated relative humidity environment; and releasing a controlled amount of $CO_2$ gas through the thermoplastic into the surrounding environment, wherein the $CO_2$ releasing material has a sufficient amount and ratio of the carbon and oxygen containing salt of the alkali or alkaline earth metal and the acid so that, in the presence of moisture, the $CO_2$ releasing composition reacts to release $CO_2$ gas through the thermoplastic into a surrounding environment;

wherein the carbon and oxygen containing salt of an alkali or alkaline earth metal is a carbonate;

wherein the composition is in the form of a film, sheet, insert or liner; and wherein the $CO_2$ releasing composition maintains a package environment for fresh or frozen seafood so as to produce sufficient $CO_2$ to slow aerobic respiration while reducing anaerobic respiration.

5. The method of claim 4 wherein the $CO_2$ releasing composition maintains a package environment for fresh or frozen seafood above about 30% $CO_2$ with an ambient $O_2$ concentration of about 20% outside the package environment.

6. The method of claim 4 wherein the $CO_2$ releasing composition maintains a package environment for fresh or frozen seafood at an elevated $CO_2$ concentration of at least about 20% and the $O_2$ concentration at about 20%.

7. A method for releasing $CO_2$ into a surrounding environment, comprising:

exposing a $CO_2$ releasing composition to an elevated relative humidity environment; wherein the $CO_2$ releasing composition comprises: $CO_2$ releasing material blended with a thermoplastic, wherein the $CO_2$ releasing material comprises carbon and oxygen containing salt of an alkali or alkaline earth metal, and an acid;

reacting the $CO_2$ releasing composition with moisture from the elevated relative humidity environment; and releasing a controlled amount of $CO_2$ gas through the thermoplastic into the surrounding environment, wherein the $CO_2$ releasing material has a sufficient amount and ratio of the carbon and oxygen containing salt of the alkali or alkaline earth metal and the acid so that, in the presence of moisture, the $CO_2$ releasing composition reacts to release $CO_2$ gas through the thermoplastic into a surrounding environment;

wherein the carbon and oxygen containing salt of an alkali or alkaline earth metal is a carbonate;

wherein the composition is in the form of a film, sheet, insert or liner; and wherein a biologically active ingredient is incorporated into the composition.

8. A method for releasing $CO_2$ into a surrounding environment, comprising:

exposing a $CO_2$ releasing composition to an elevated relative humidity environment; wherein the $CO_2$ releasing composition comprises: $CO_2$ releasing material incorporated in a thermoplastic, wherein the $CO_2$ releasing material comprises carbon and oxygen containing salt of an alkali or alkaline earth metal, and an acid;

reacting the $CO_2$ releasing composition with moisture from the elevated relative humidity environment; and releasing a controlled amount of $CO_2$ gas through the thermoplastic into the surrounding environment, wherein the $CO_2$ releasing material has a sufficient amount and ratio of the carbon and oxygen containing salt of the alkali or alkaline earth metal and the acid so that, in the presence of moisture, the $CO_2$ releasing composition reacts to release $CO_2$ gas though the thermoplastic into a surrounding environment;

wherein the carbon and oxygen containing salt of an alkali or alkaline earth metal is a carbonate;

wherein the composition is in the form of a film, sheet, insert or liner;

wherein a biologically active ingredient is incorporated into the composition; and wherein the biologically active ingredient is chlorine dioxide and added in sufficient amounts with the $CO_2$ releasing material so as to produce a modified atmosphere of about 30% $CO_2$, about 20% $O_2$ and about 50% $N_2$ for seafood.

9. A method for releasing $CO_2$ into a surrounding environment, comprising:

exposing a $CO_2$ releasing composition to an elevated relative humidity environment; wherein the $CO_2$ releasing composition comprises: $CO_2$ releasing material incorporated in a thermoplastic, wherein the $CO_2$ releasing material comprises carbon and oxygen containing salt of an alkali or alkaline earth metal, and an acid;

reacting the $CO_2$ releasing composition with moisture from the elevated relative humidity environment; and releasing a controlled amount of $CO_2$ gas through the thermoplastic into the surrounding environment, wherein the $CO_2$ releasing material has a sufficient amount and ratio of the carbon and oxygen containing salt of the alkali or alkaline earth metal and the acid so that, in the presence of moisture, the $CO_2$ releasing composition reacts to release $CO_2$ gas through the thermoplastic into a surrounding environment;

wherein the carbon and oxygen containing salt of an alkali or alkaline earth metal is a carbonate;

wherein the composition is in the form of a film, sheet, insert or liner; and wherein The $CO_2$ releasing composition is integrated into a $CO_2$ releasing film into a package with a barrier film having selective permeation to $O_2$ and $CO_2$.

10. A method for releasing $CO_2$ into a surrounding environment, comprising:

exposing a $CO_2$ releasing composition to an elevated relative humidity environment; wherein the $CO_2$ releasing composition comprises: $CO_2$ releasing material incorporated in a thermoplastic, wherein the $CO_2$ releasing material comprises carbon and oxygen containing salt of an alkali or alkaline earth metal, and an acid;

reacting the $CO_2$ releasing composition with moisture from the elevated relative humidity environment; and releasing a controlled amount of $CO_2$ gas through the thermoplastic into the surrounding environment, wherein the $CO_2$ releasing material has a sufficient amount and ratio of the carbon and oxygen containing salt of the alkali or alkaline earth metal and The acid so that, in the presence of moisture, the $CO_2$ releasing composition reacts to release $CO_2$ gas through the thermoplastic into a surrounding environment;

wherein the carbon and oxygen containing salt of an alkali or alkaline earth metal is a carbonate;

wherein the composition is in the form of a film, sheet, insert or liner; and wherein the $CO_2$ releasing composition produces a sufficient amount of $CO_2$ in a film form so as to maintain a gas environment in the package of about 40% $CO_2$, 40% nitrogen and 20% oxygen.

* * * * *